United States Patent [19]
Howes

[11] Patent Number: 5,620,197
[45] Date of Patent: Apr. 15, 1997

[54] MOTORCYCLE TOWING DEVICE

[76] Inventor: J. Roy Howes, 665 NW. Archer Ave., Port St. Lucie, Fla. 34983

[21] Appl. No.: 550,432

[22] Filed: Oct. 30, 1995

[51] Int. Cl.⁶ ...................................................... B60R 9/10
[52] U.S. Cl. .......................................... 280/402; 414/462
[58] Field of Search ............................ 280/402; 414/536, 414/462, 463, 466, 539, 546, 555

[56] References Cited

U.S. PATENT DOCUMENTS

| | | | |
|---|---|---|---|
| 3,740,074 | 6/1973 | Coil | 280/402 |
| 4,113,272 | 9/1978 | Sebby | 280/402 |
| 4,603,874 | 8/1986 | Merrill | 280/402 |
| 5,145,308 | 9/1992 | Vaughn et al. | 280/402 X |
| 5,228,712 | 7/1993 | Speier | 280/402 X |

*Primary Examiner*—Kevin Hurley
*Attorney, Agent, or Firm*—Ronald E. Greigg

[57] ABSTRACT

A towing apparatus for a two-wheeled or three-wheeled motorcycle is provided having a support bar which slidably engages a hitch receiver connected to the towing vehicle and having a pivotally connected ramp which, when in a towing position, supports the front wheel. The towing apparatus includes two embodiments, one employing a hydraulic ram to raise the pivotable ramp and the other employing an eye bolt and nut to draw down an arm attached to the pivotable ramp. In either case, support straps are used to create a self-loading, one-person operable device which can be used for running and non-running two-wheeled or three-wheeled motorcycles. This device has the capability of being disassembled and, in such state, this relatively lightweight device is easily stored in its own carrying case.

11 Claims, 11 Drawing Sheets

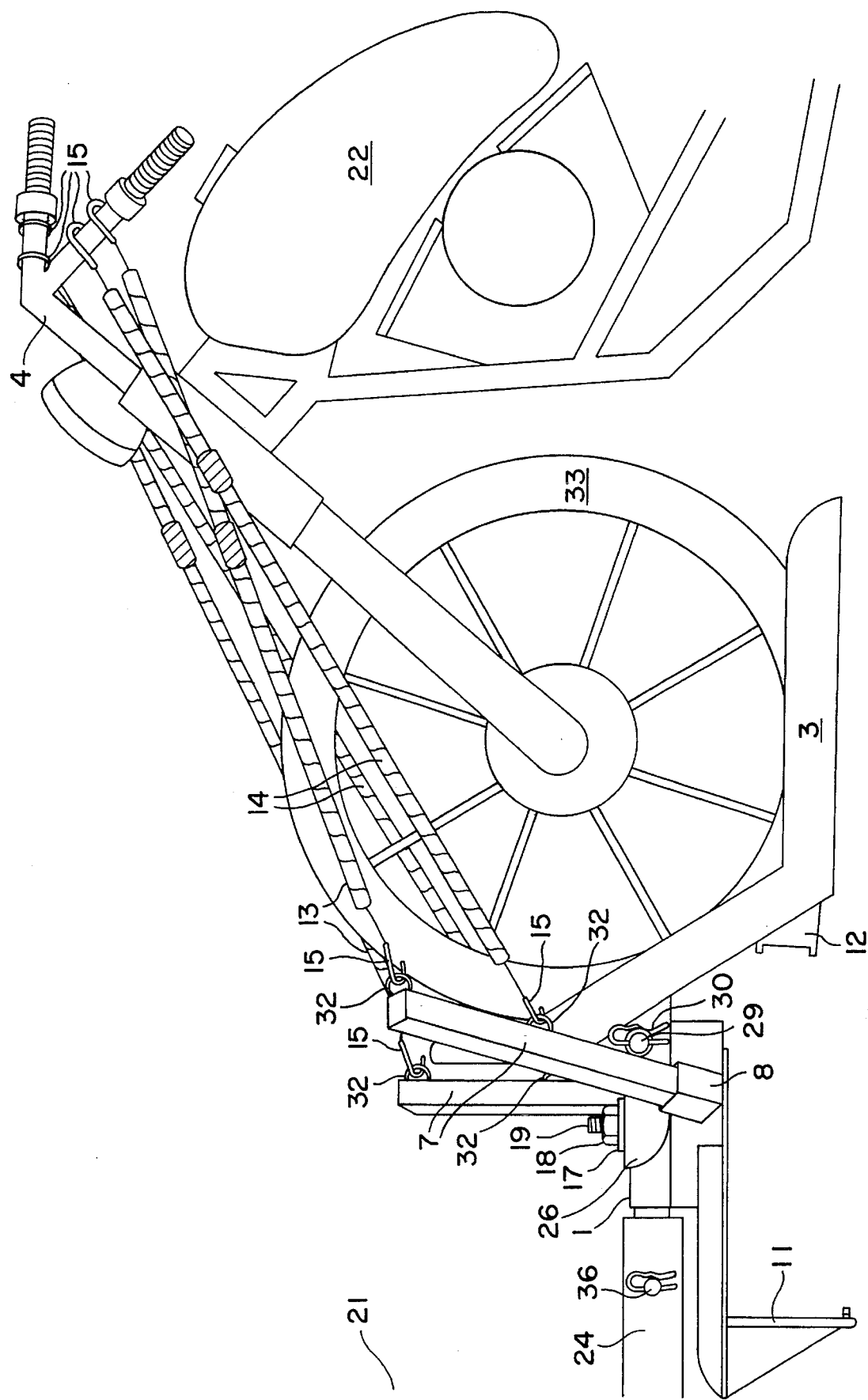

MOTORCYCLE TOWING DEVICE

FIELD OF THE INVENTION

This invention relates to improvements in motorcycle towing devices.

BACKGROUND OF THE INVENTION

This invention forms an improvement upon the state-of-art for towing cycle-type vehicles by automobiles and trucks. The prior art discloses devices which have various drawbacks. They either attach to vehicle bumpers, are permanently attached to a vehicle, fit only a single cycle type or cannot be disassembled for storage convenience.

In particular, certain patents teach that either the supporting straps or the device itself must be attached to the towing vehicle's bumper making these devices obsolete for use with current vehicles that no longer have steel bumpers.

Still other patents are not one-person operable and would require a great deal of effort to load and unload a motorcycle.

Still other patents are designed for specific makes and models of motorcycles.

Certain patents teach the use of hydraulic power to lift the cycle, but in one the device must be permanently attached to the towing vehicle while in the other a removable hydraulic ram is disclosed not for use with motorcycles; its configuration places great pressure on the hitch thus requiring at least a one ton truck as a towing vehicle.

DETAILED DISCUSSION OF THE DISADVANTAGES OF THE PRIOR ART

U.S. Pat. No. 4,113,272 discloses a hydraulic jack—but the device is not built to haul a motorcycle and a motorcycle will fall over if carried on it. It puts all pressure on the hitch which then means at least a 1 ton truck would be required to haul anything.

U.S. Pat. No. 4,111,449 discloses an attachment to a bumper. It was patented in 1978 when cars had steel bumpers, but is obsolete now because most cars have plastic bumpers. It will only work with a light motorcycle; a big, heavy motorcycle such as a Harley-Davidson would damage the bumper.

U.S. Pat. No. 4,563,018 discloses a device wherein the car needs an expensive hitch built onto it. It can only be permanently attached to an extended bumper such as on a truck or bus.

U.S. Pat. No. 3,822,898 discloses a device that takes at least two strong people to load and unload a large motorcycle. It has straps that attach to the vehicle—modern cars have nowhere to attach straps since steel bumpers are no longer used.

U.S. Pat. No. 2,489,771 also requires two strong people to load and unload a motorcycle. It discloses U-bolts that hold the wheel in place but this idea will not work on motorcycles with solid wheels. Furthermore, those U-bolts could cause damage to the wheels with which it will work.

U.S. Pat. No. 3,428,332 again requires two strong people to load and unload the motorcycle. Here there are stabilizer straps bolted to the bumper so it also will not work on newer car bumpers.

U.S. Pat. No. 3,740,074 also requires two strong people to load and unload the motorcycle. This device requires a considerable amount of time, skill and tools needed to assemble and disassemble it. The device is so large that storage, when not in use, is prohibitive because of space needed.

U.S. Pat. No. 3,776,572 discloses a device which will not work with today's motorcycles since tire size variations in today's motorcycles are from 2" to 6" which makes this device unworkable for a wide range of motorcycles. Furthermore, it is doubtful the average person would have the strength required to lever and lift a heavy motorcycle. It is also questionable how a motorcycle will stay balanced while being towed without the use of stabilizer straps.

U.S. Pat. No. 5,145,308 is an impractical disclosure because of all the springs, levers and hinges that could fail. Part No. 21 is not designed for a heavy motorcycle. Parts Nos. 58 & 59 (disk shaped pads) are intended to stabilize the tires. Today's motorcycle tires range from 14" to 21" in diameter, yet Parts Nos 58 & 59 are not adjustable. Different sized wheels will not align. It is not easily loaded by one person. If the motorcycle does not run, one person could not get it on the ramp. One person could not balance the motorcycle in a hauler and use lever No. 67 that compresses the tire at the same time. The description for unloading the motorcycle refers to using an engine to unload but, since motorcycles do not have a reverse gear, it would therefore take two strong people to push the motorcycle up and over the pivot point No. 51 and down the ramp. This device provides for unsafe loading and unloading by suggesting driving the motorcycle on the ramp which raises the motorcycle so that the driver's feet could not touch the ground. Standing next to the motorcycle, using the clutch and gas to load the running motorcycle is impractical for large motorcycles because it would be difficult to balance.

OBJECTS OF THE INVENTION

It is a principal object of the invention to provide a motorcycle towing device in kit form.

It is another object of the invention to provide a towing device which is made up of lightweight and easily assembled parts.

It is still another object of the invention to provide a towing device which can be operated by one person, acting alone without assistance.

It is yet another object of the invention to provide a motorcycle owner with a convenient, economical to purchase and easy to store part-time trailering mechanism.

These and other advantages will become clear from a reading of the following description of the drawings taken in conjunction with the detailed description of the preferred embodiments.

SUMMARY OF THE INVENTION

This towing device provides in kit form a series of elemental parts that can be assembled into a towing apparatus that can be received into a hitch receiver on a car or truck, so that the motorcycle can be loaded on it by a single person, and once loaded the cycle will trail behind the car or truck to a destination, such as an enthusiast's rally, to races, on vacation, etc. Once one arrives at the destination, the cycle can be off-loaded from the device, the device disassembled and the parts returned to a fitted storage case which can then be stored in a vehicle trunk. In this way, the desire to tow one's motorcycle is not offset negatively by the need to store a full trailer at the destination (or to risk theft of that trailer), or even to deal with devices such as the prior art disclosed which are either not disassembled or storable in the trunk of an average modern car for they are simply too big, too bulky and too heavy.

In essence, this invention provides a simple, convenient parttime trailering mechanism when a trailer is needed without the costs, risks or problems associated with a device that is always assembled.

DETAILED DESCRIPTION OF THE PREFERRED EMBODIMENTS

Figure 1:
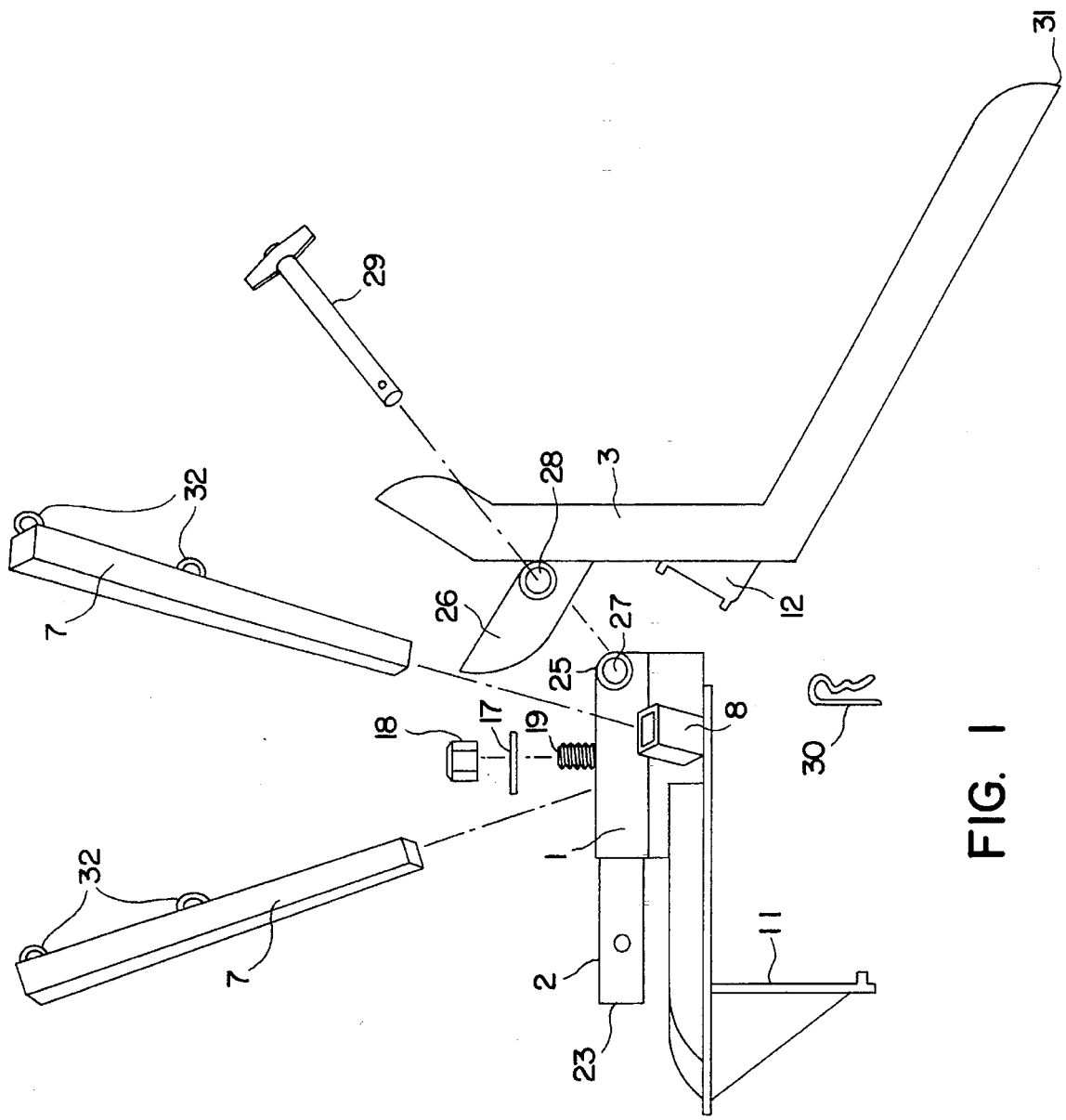
FIG. 1 shows an exploded left side view of the trailering device following the invention.

Referring now to FIG. 1, this is an exploded view of the motorcycle towing apparatus according to the invention, in which certain major elements are shown including the support bar 1 provided with a tongue portion 23; the wheel ramp or cradle 3; a ramp arm or receiver 26 which allows pivotable connection between the wheel cradle and the support bar via a pivot pin 29; a pair of stabilizer bars 7, 7' having hooks 32 from which straps may extend to the handle-bars of the motorcycle being towed; a support plate 11 is provided for a hydraulic jack (not shown), which jack operates to raise the wheel cradle via a jacking stud 12 disposed on the back of the wheel ramp; and a bolt 19 is provided on an upper surface of the support plate over which the ramp receiver 26 is received and held once the wheel cradle is jacked into towing position.

Figure 2:
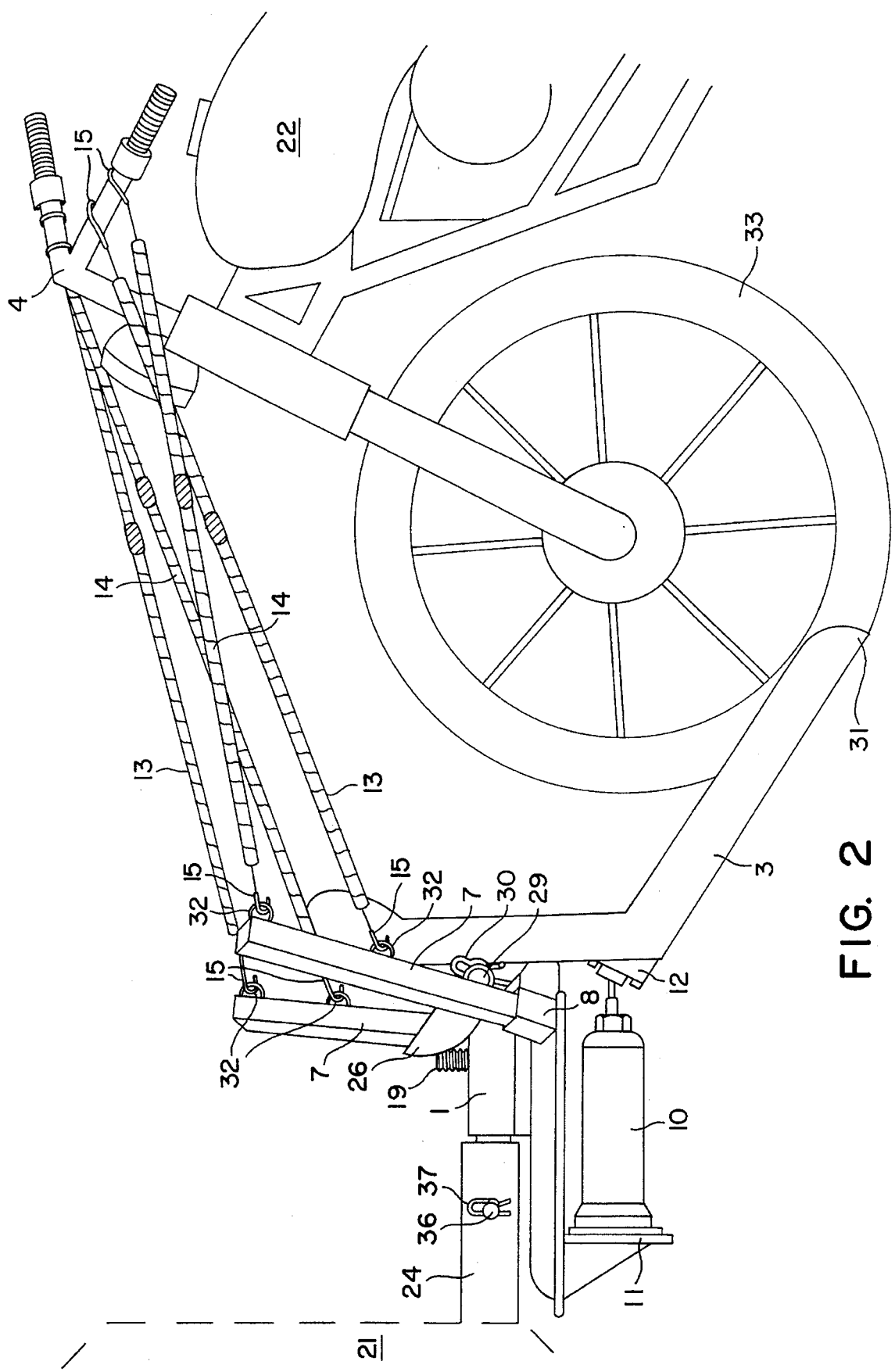
FIG. 2 shows a left side view of the trailering device assembled and attached to a vehicle, only suggested, with a front wheel of a motorcycle received in the ramp, straps connected to the handlebars and a hydraulic jack or ram installed to elevate the ramp.

Referring now to the other drawings, and especially FIG. 2, the motorcycle towing apparatus referred to generally as 20 is used with a towing vehicle 21 for towing a motorcycle 22. The support bar 1 is provided with a rectangular cross section. A tongue portion 23 of support bar 1 is designed to slidably engage and rigidly connect to a hitch receiver 24 carried by the towing vehicle. An aperture 2 (FIG. 1) is provided in the tongue portion 23 of support bar 1, through which a receiver pin 36 is extended to secure the support bar 1 to the hitch receiver 24 carried by the towing vehicle. The pin 36 is held in place by hitch pin 37. The ramp receiver 26 is placed over the rear extremity 25 (FIG. 1) of the support bar 1 so that the apertures 27 & 28 are aligned to receive pivot pin 29 which is secured with hitch pin 30.

Figure 4:
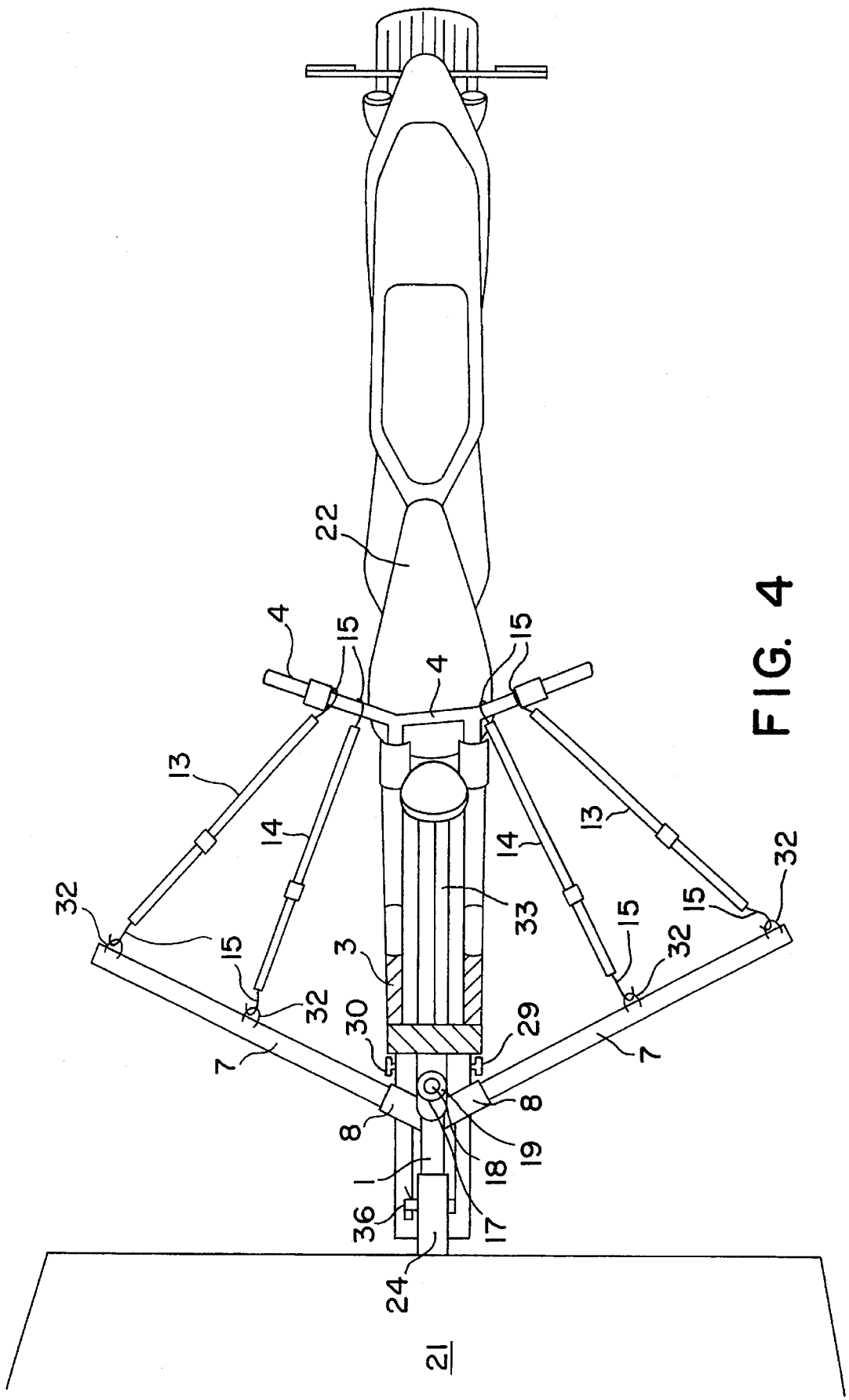
FIG. 4 is a top view of the motorcycle in towing position showing the straps attached between the stabilizer bars and the handlebars.
Figure 7:
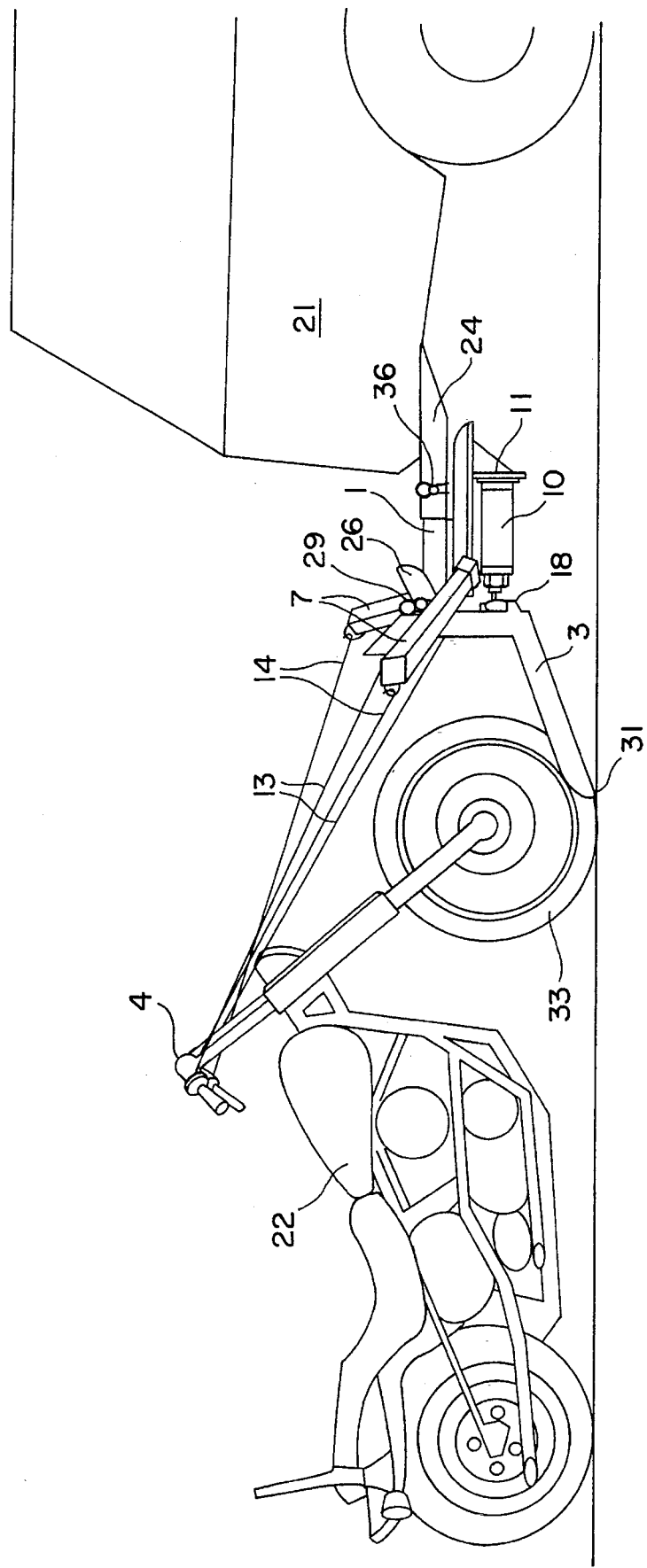
FIG. 7 shows a right side view of the trailering device in a position wherein the hydraulic jack has been installed and the front wheel lowered to the ground for off-loading.
Figure 8:
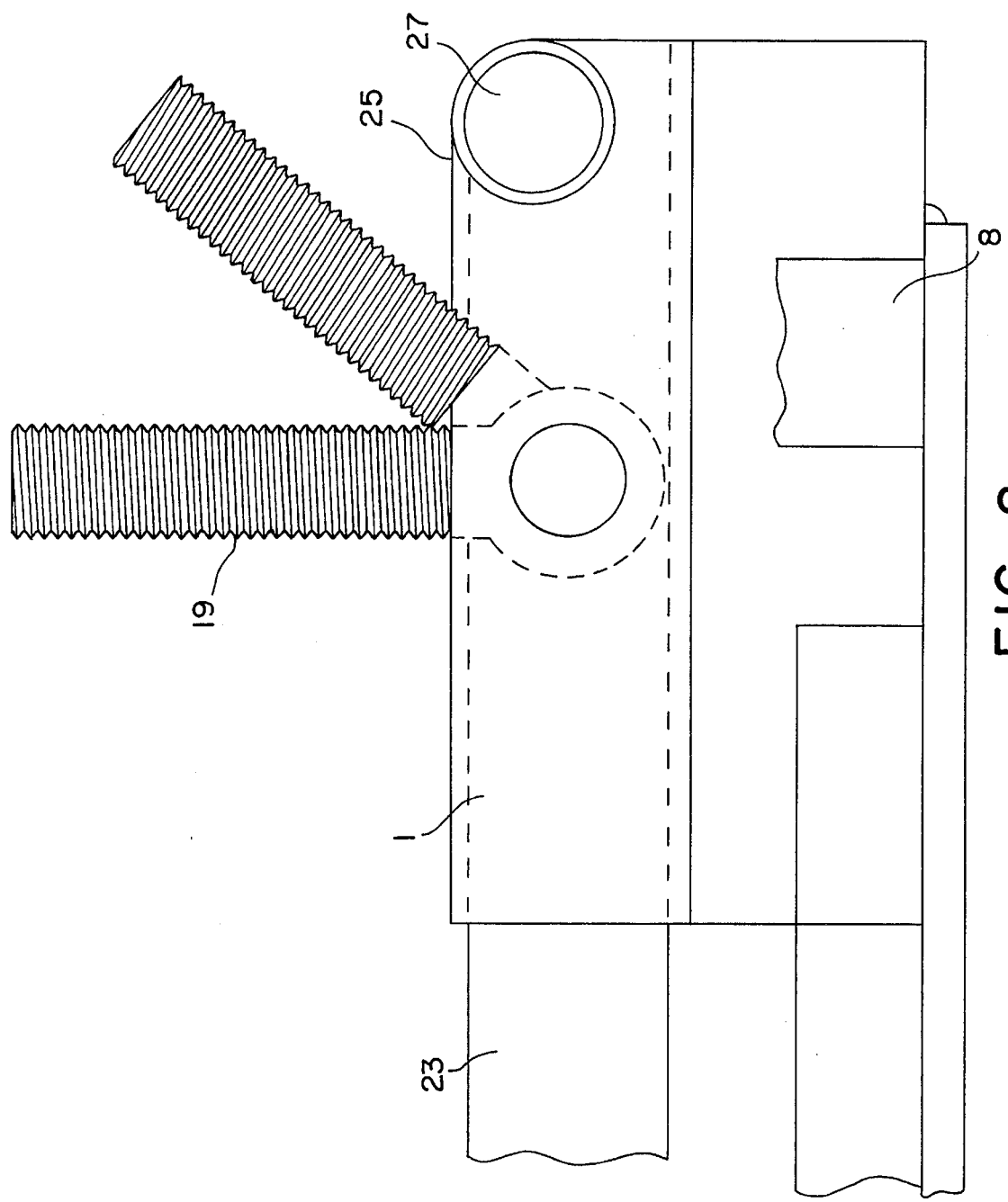
FIG. 8 shows an eye bolt used in the embodiment of FIGS. 9–11 as an alternative to the hydraulic jack, the bolt being disposed on a support bar.
Figure 9:
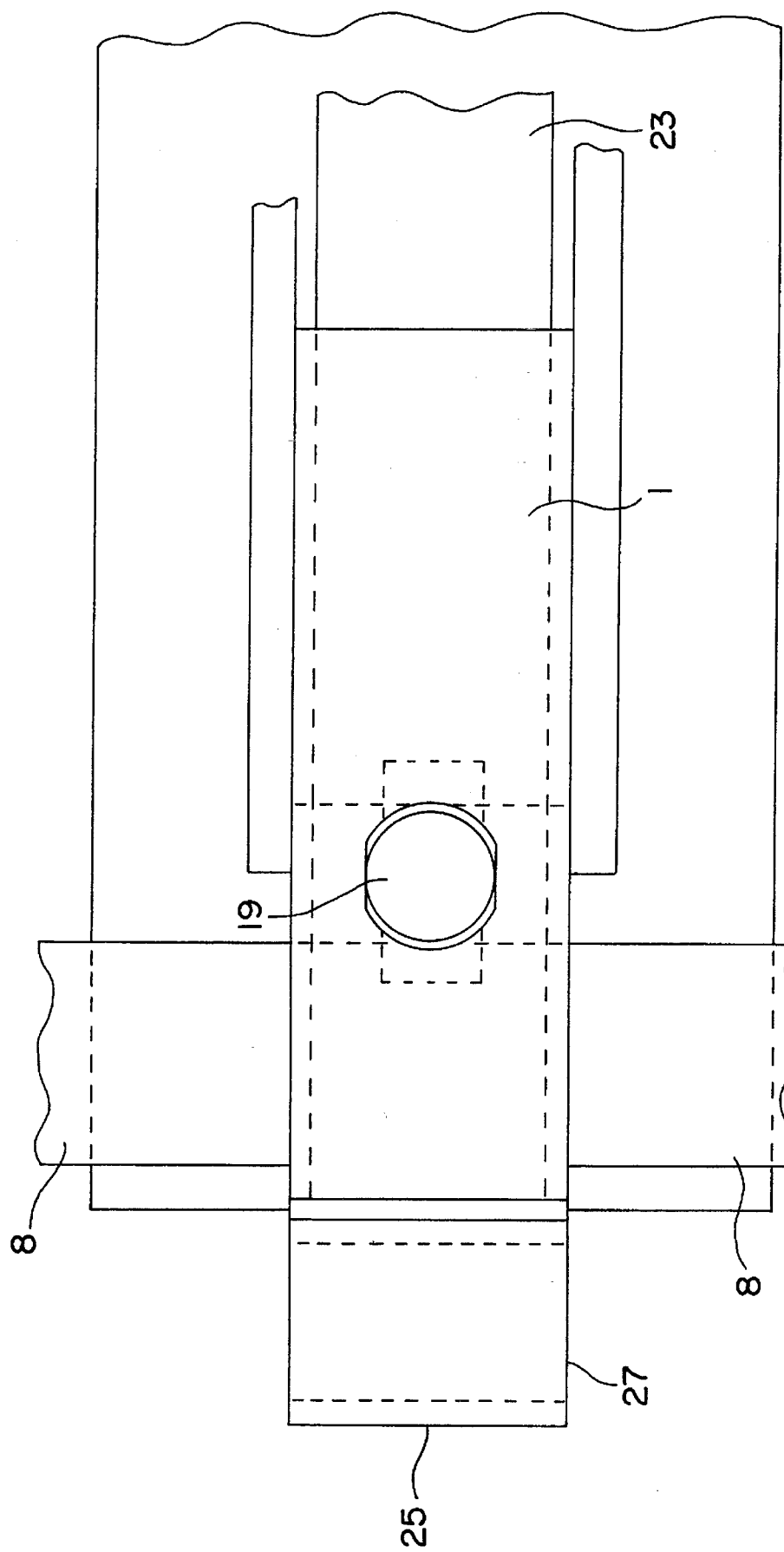
FIG. 9 shows a top plan view of the support bar in partial cross-sectional view in which the eye bolt is shown plug welded into the support bar.
Figure 10:
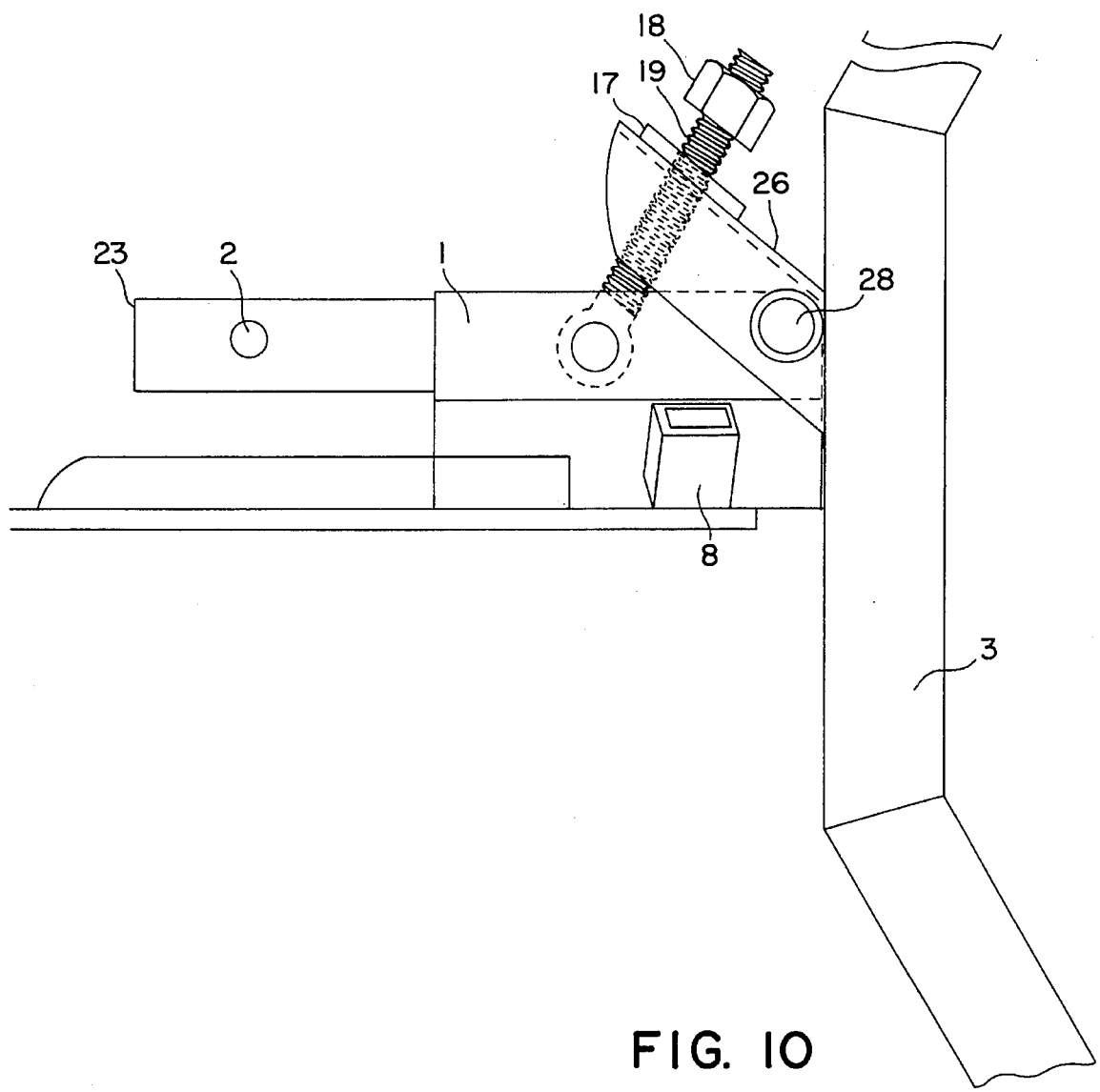
FIG. 10 is a partial sectional view of the support bar showing the ramp receiver being penetrated by the eye bolt to which a nut has been partially wound down.
Figure 11:
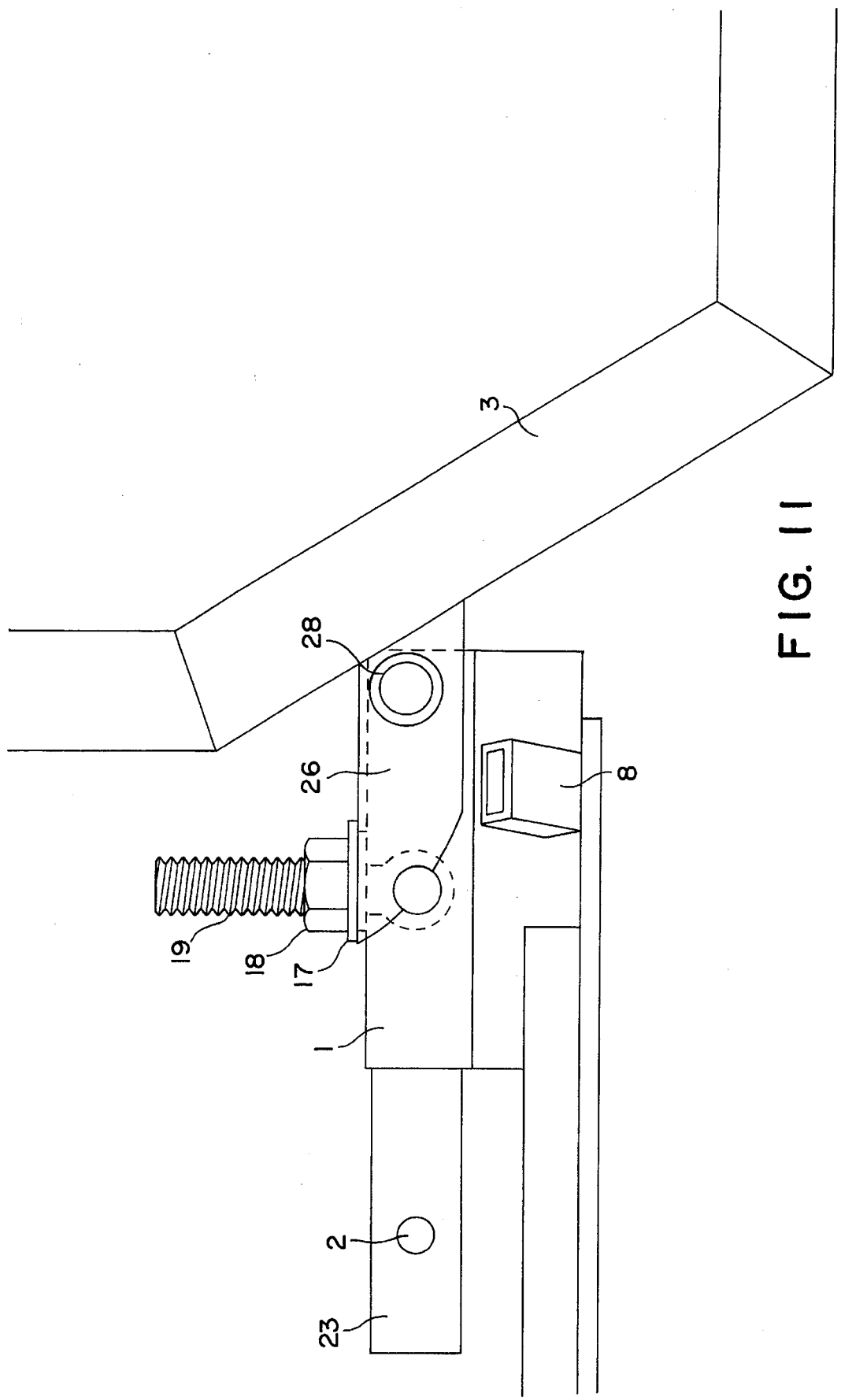
FIG. 11 shows the ramp receiver securely held by the tightened nut flush upon the support bar, the wheel ramp elevated into its trailering position.
Figure 2:
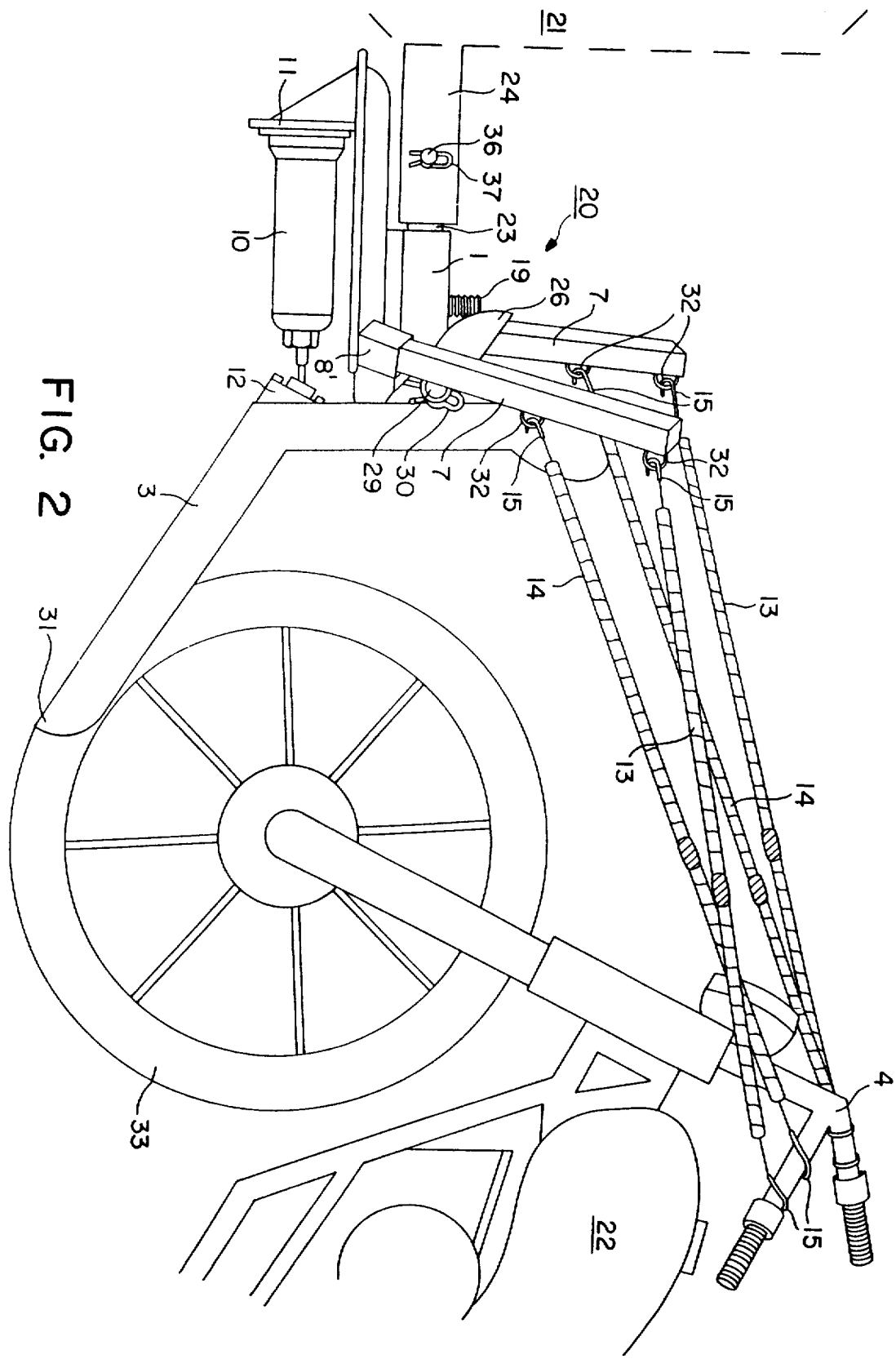
Figure 3:
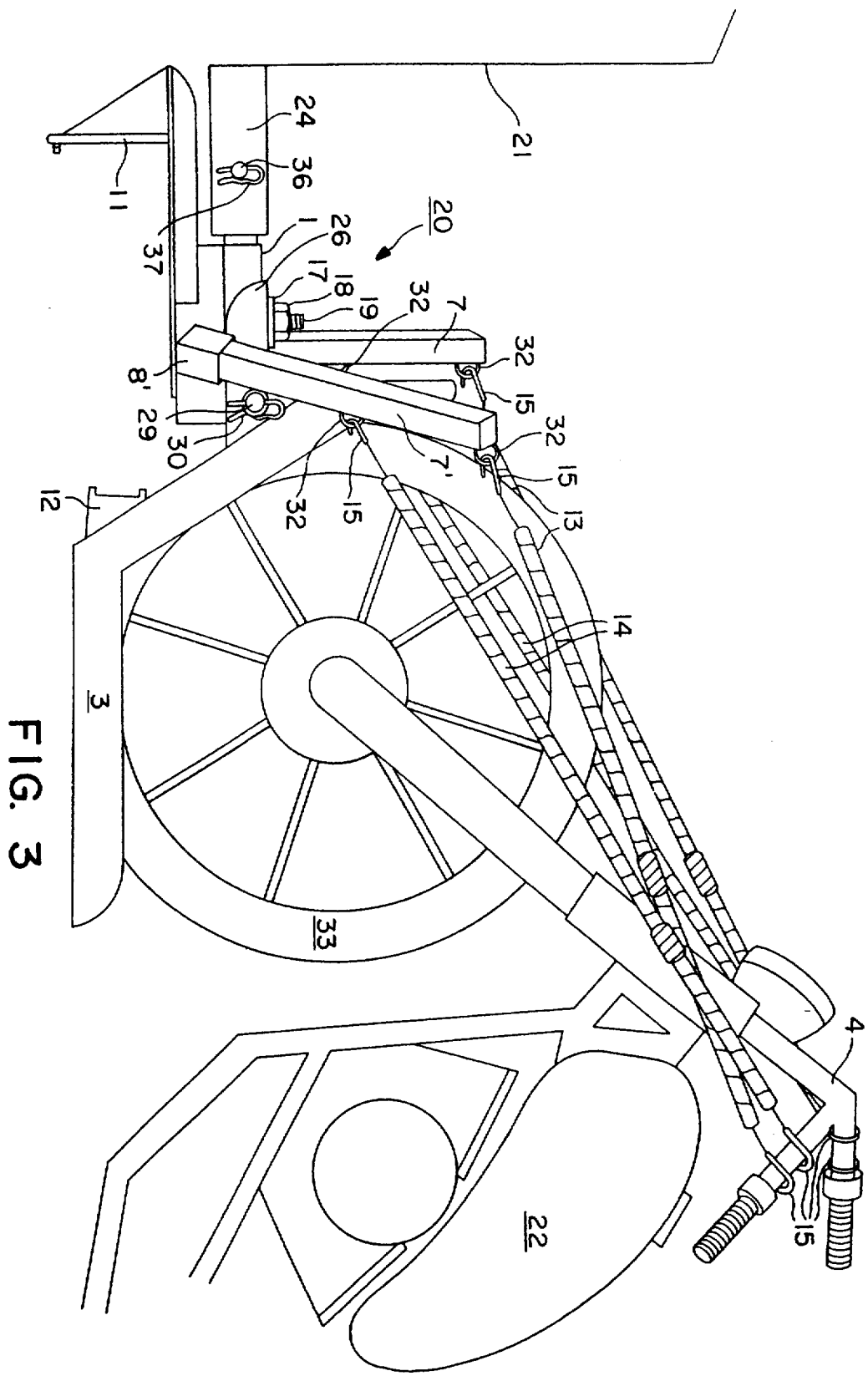
FIG. 3 shows a left side view of the trailering device in towing position, in greater detail and with the hydraulic jack removed.
Figure 4:
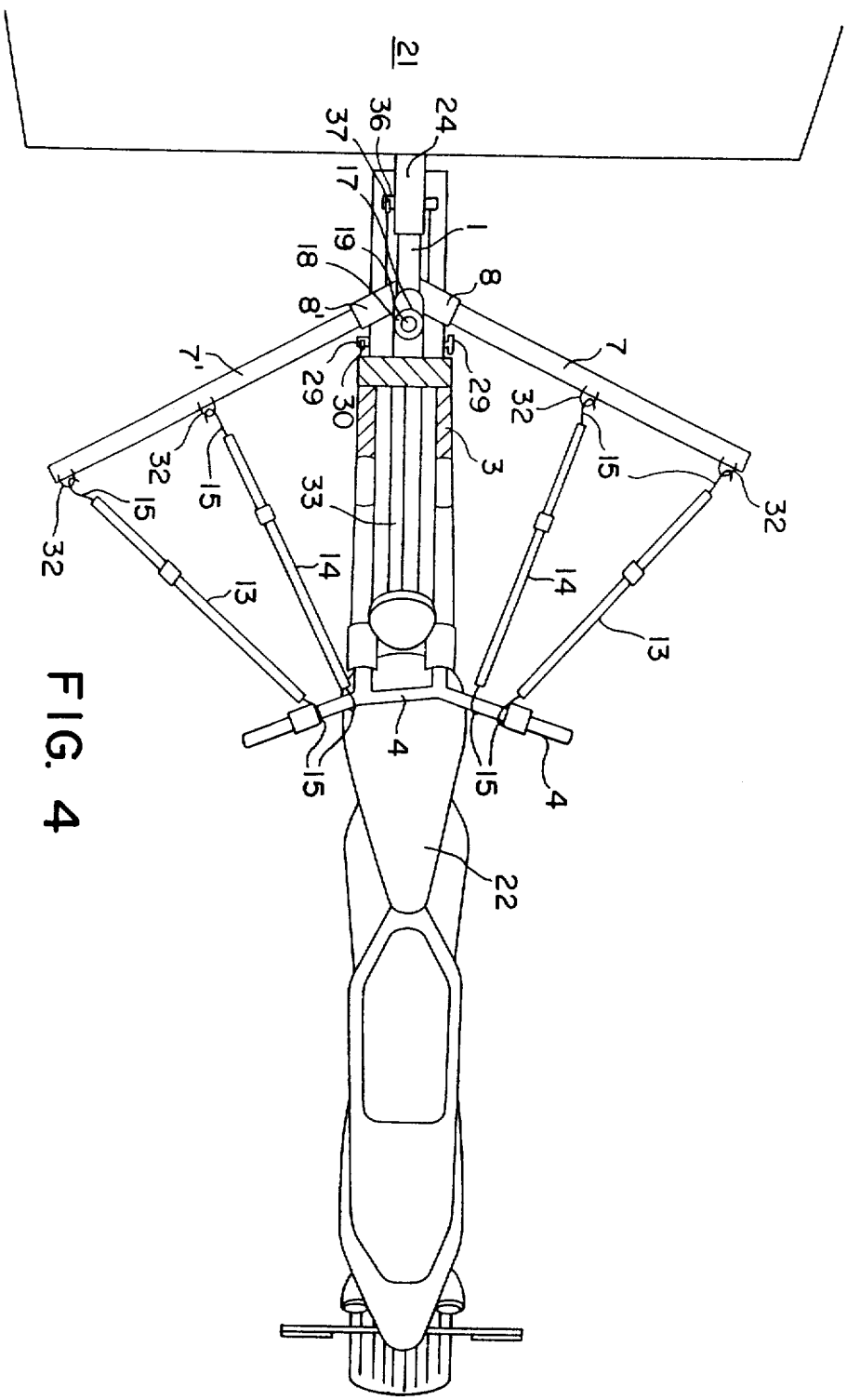
Figure 5:
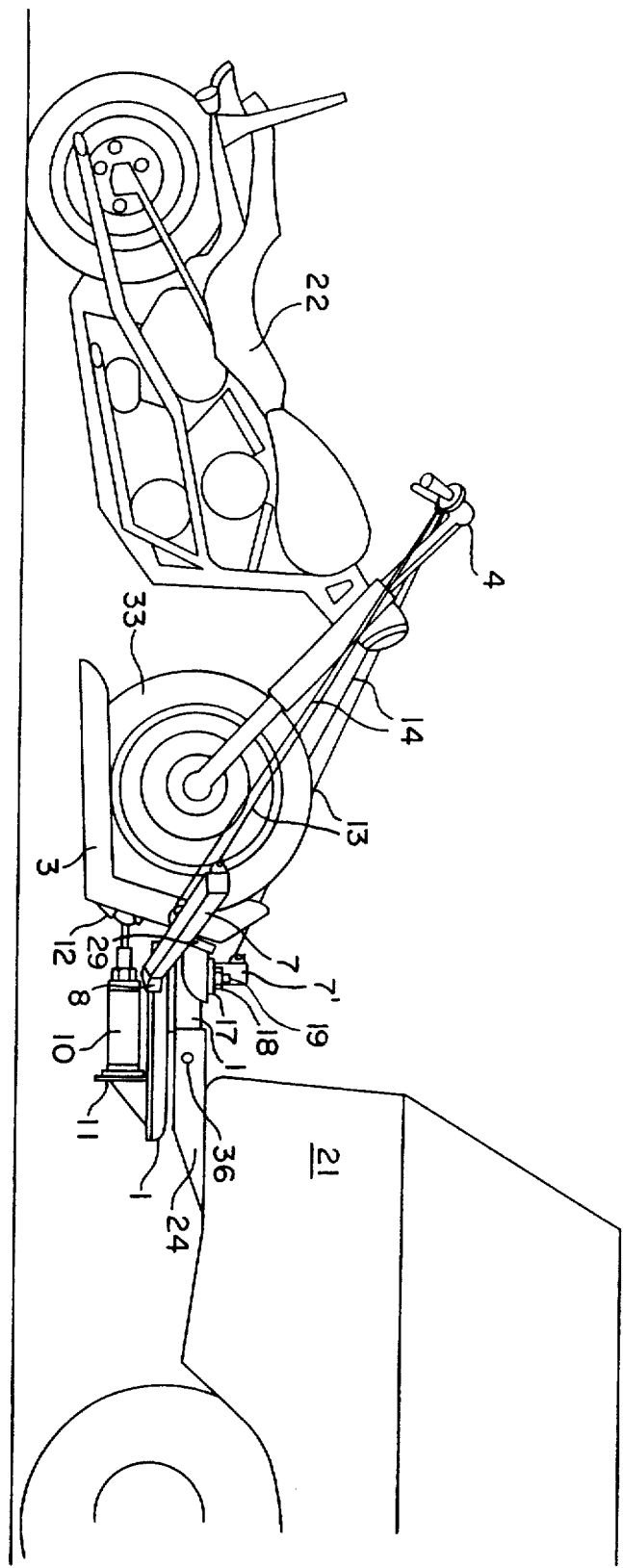
Figure 6:
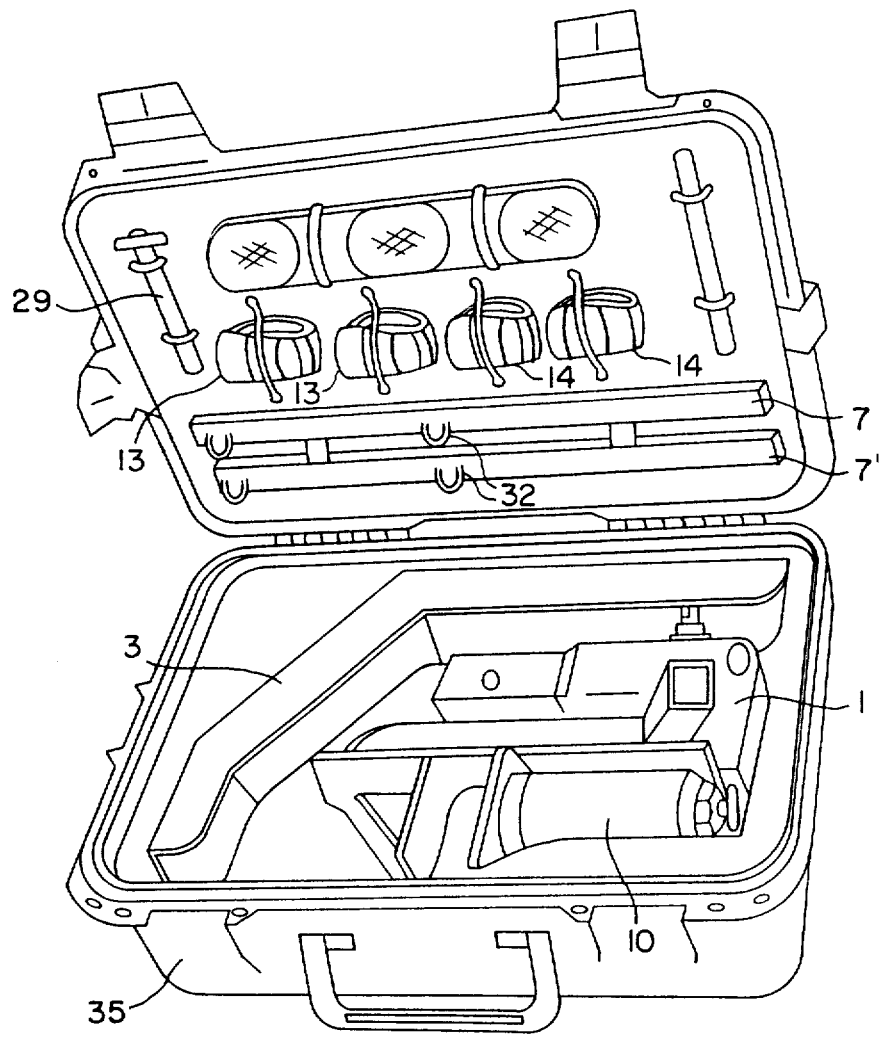
Figure 7:
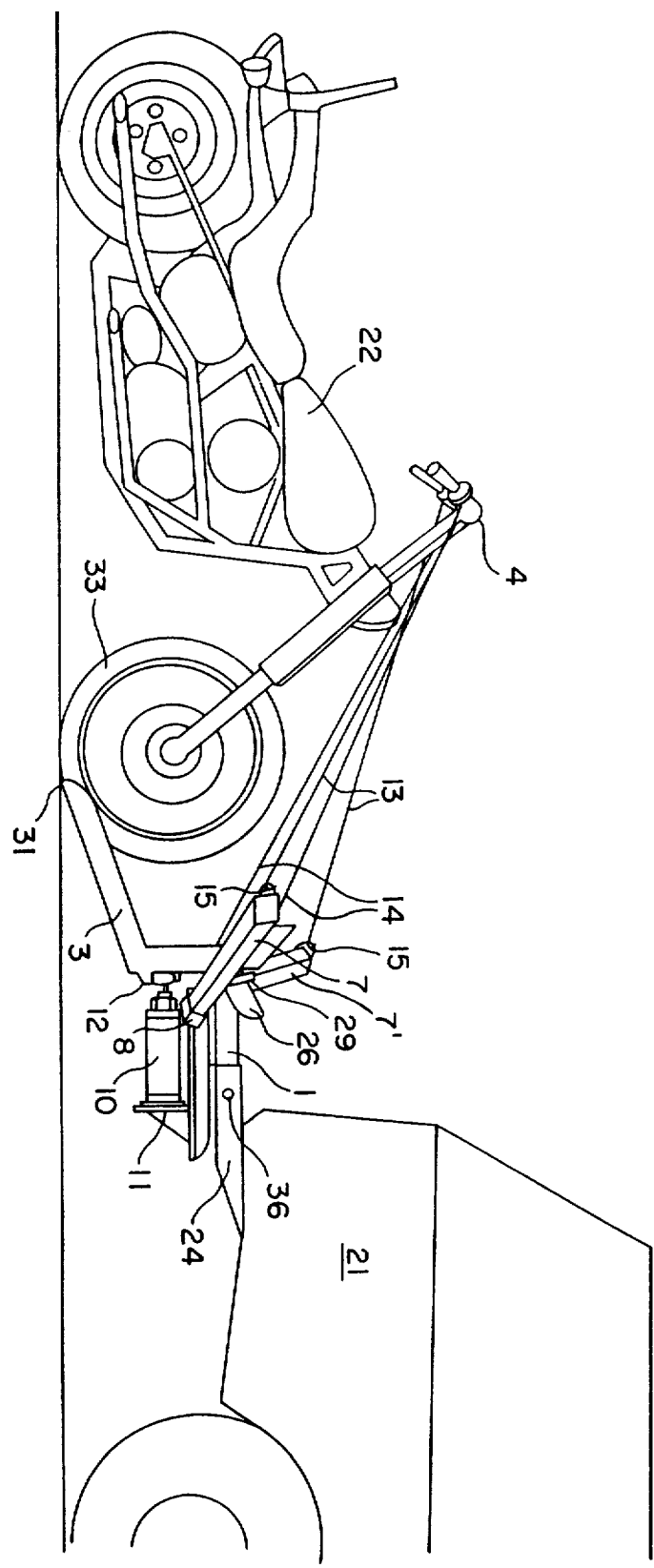
Figure 9:
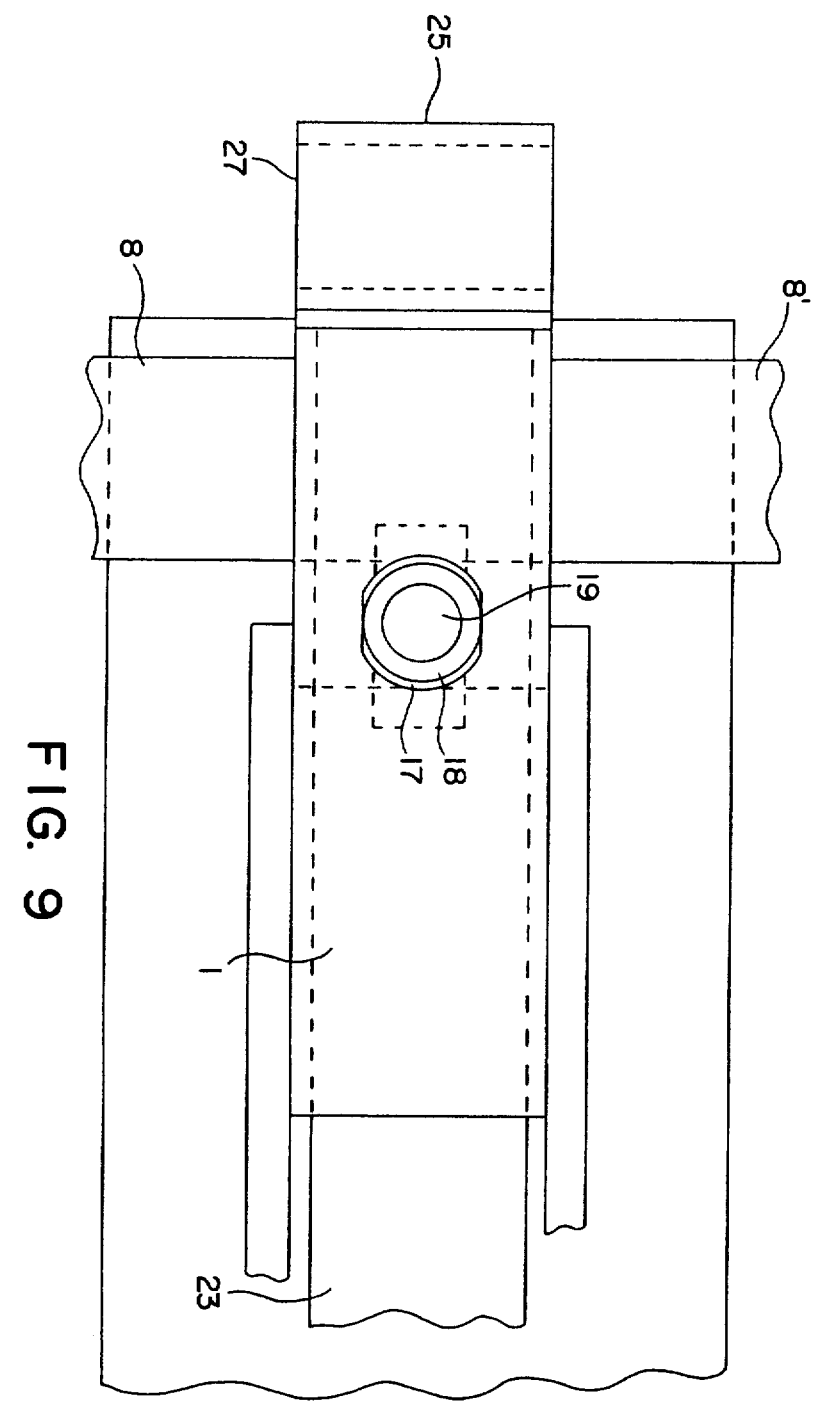
Figure 10:
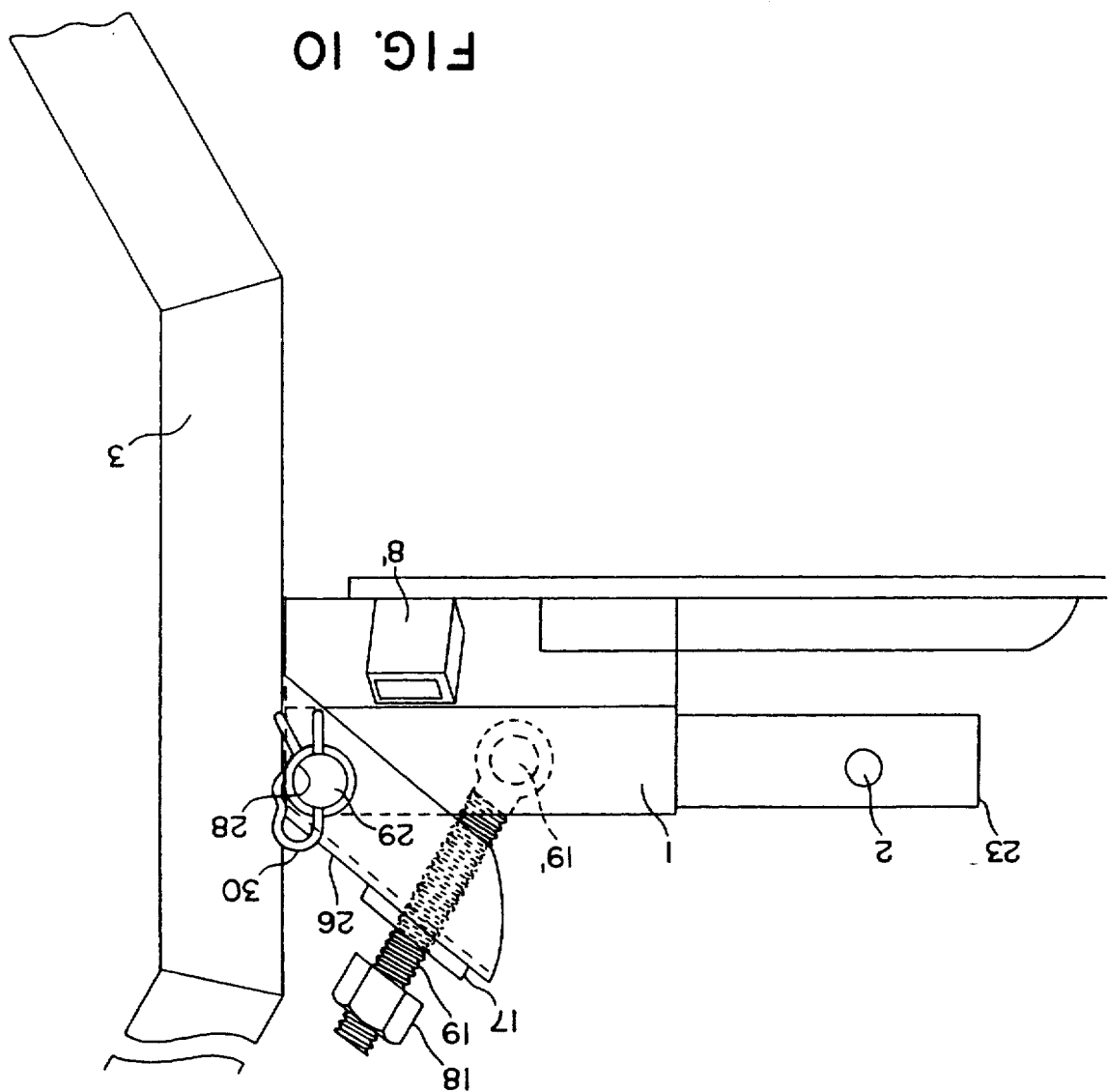
Figure 11:
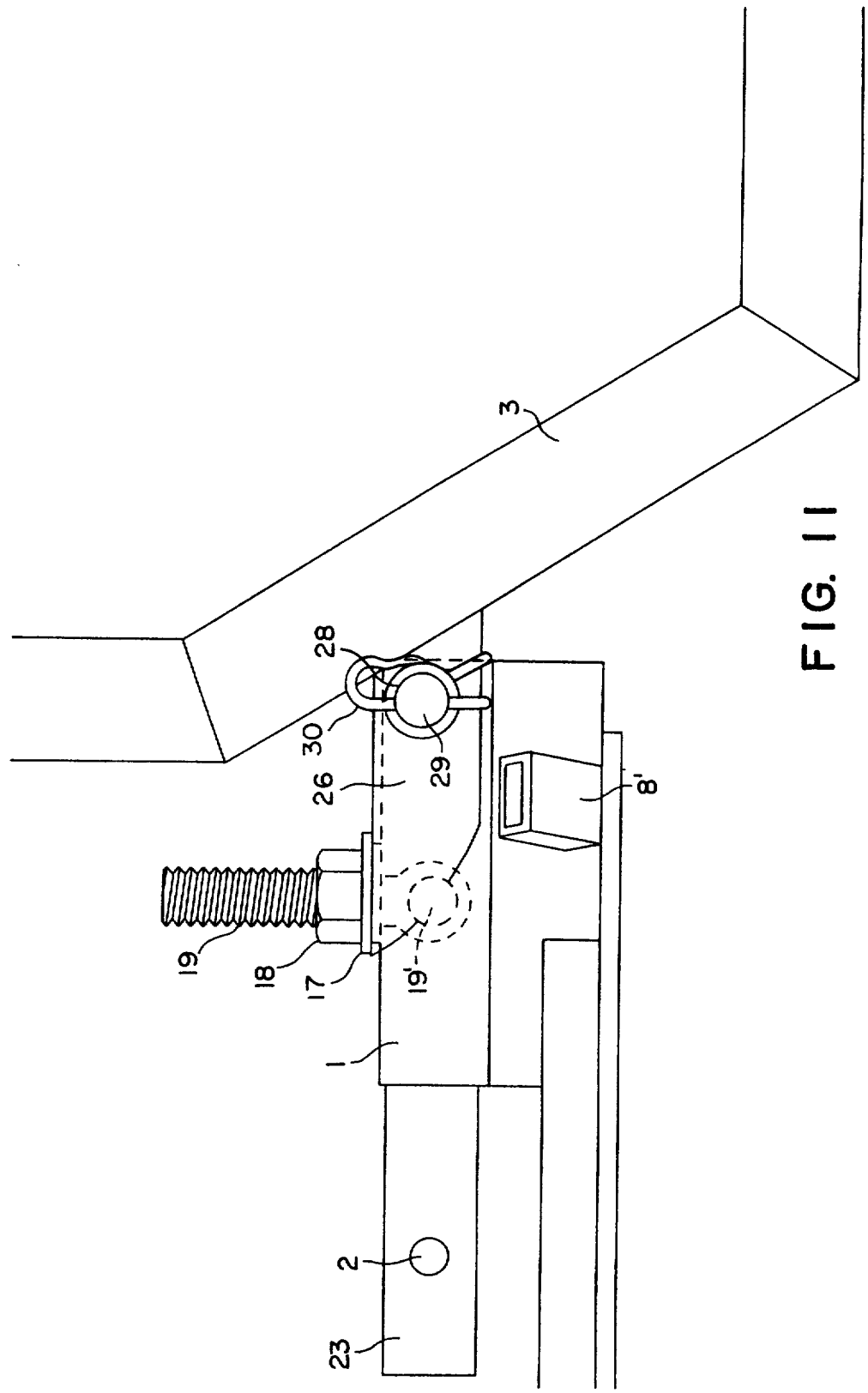

As shown best in FIGS. 2 and 3, the ramp or wheel cradle 3 has two positions: the first position shown in FIG. 2 in which the ramp or wheel cradle 3 is inclined downwardly from the pivot point created by pin 29 and in which position a rear portion 31 of the ramp or wheel cradle contacts the ground. Ramp or wheel cradle 3 has a second position shown in FIG. 3 in which ramp or wheel cradle 3 is elevated a sufficient height off the ground to provide clearance during towing. As shown in FIGS. 2 & 7, motorcycle 22 is placed in position behind towing device 20 so that the front wheel 33 of motorcycle 22 is aligned with and as close as possible to ramp or wheel cradle 3. A hydraulic jack 10 (FIG. 2, 5 & 7) is then placed under the hitch with the base of jack 10 resting on support plate 11 and with the ram fitted into a depression on the jacking stud 12 disposed on the back of ramp 3. The pair of stabilizer bars (7, 7') are placed into square holes (8, 8') on each side of support bar 1. As best shown in FIG. 4, adjustable stabilizer strap pair 13 and pair 14, having hooks 15 on both ends are secured to steel loops 32 provided on the stabilizer bars (7, 7') and to motorcycle handle bars 4 so that two straps attach on each side of the motorcycle 22 to stabilize it laterally from falling.

Figure 5:
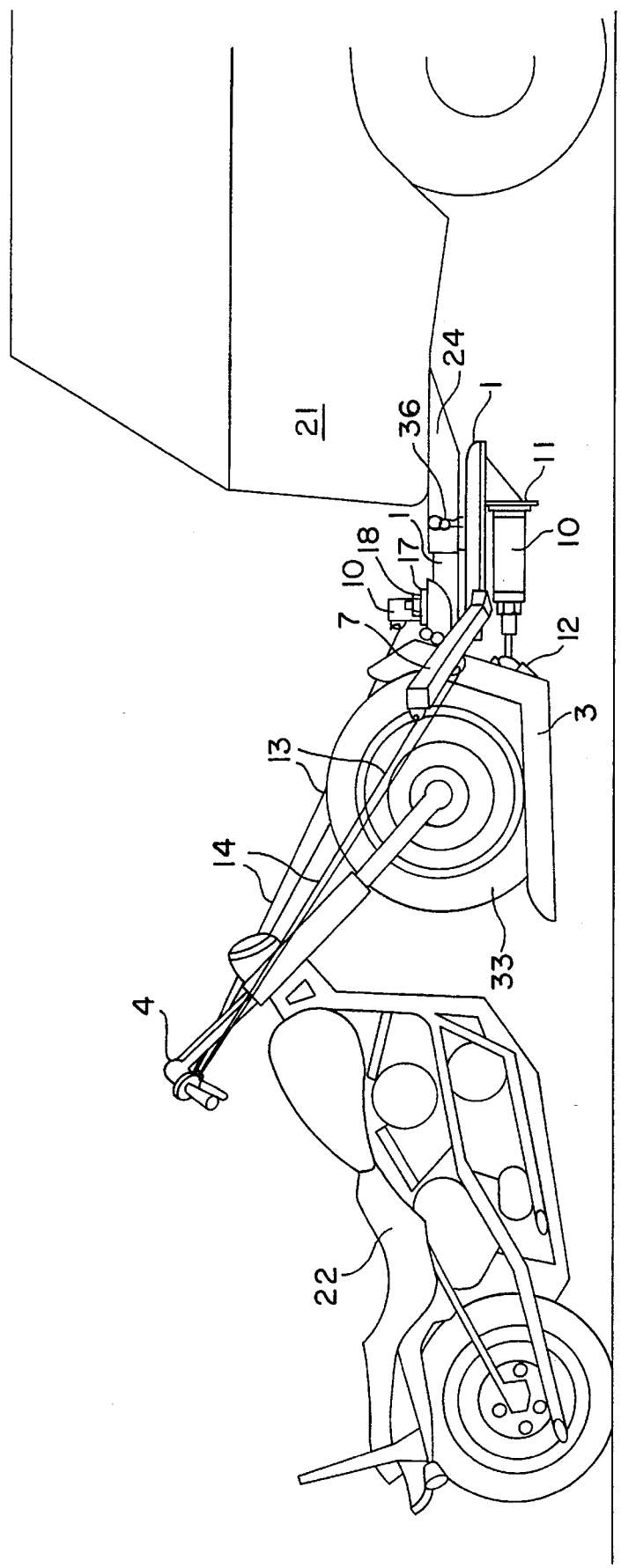
FIG. 5 shows a right side view of the motorcycle elevated into towing position by the hydraulic jack.

The process to achieve a stable footing for the motorcycle is as follows: The outside straps 13 are tightened. The hydraulic jack 10 is then pumped so that the wheel cradle 3 raises by pivoting on pin 29. The motorcycle wheel 33 will be pulled onto wheel cradle 3 by tightened strap pair 13 and wheel cradle 3 will raise into the towing position shown in FIG. 3. Stabilizer (safety) strap pair 14 are then also tightened. When the wheel cradle is in a towing position, a threaded stud 19 (FIG. 1 & 2) will protrude through an elongated aperture (not shown) in ramp receiver 26 (FIG. 2) on which a washer 17 and nut 18 are installed and tightened, thus securing the towing device 20 in the towing position shown in FIGS. 3 & 5. The hydraulic jack 10 can be lowered from its jacked position and removed prior to towing.

Figure 6:
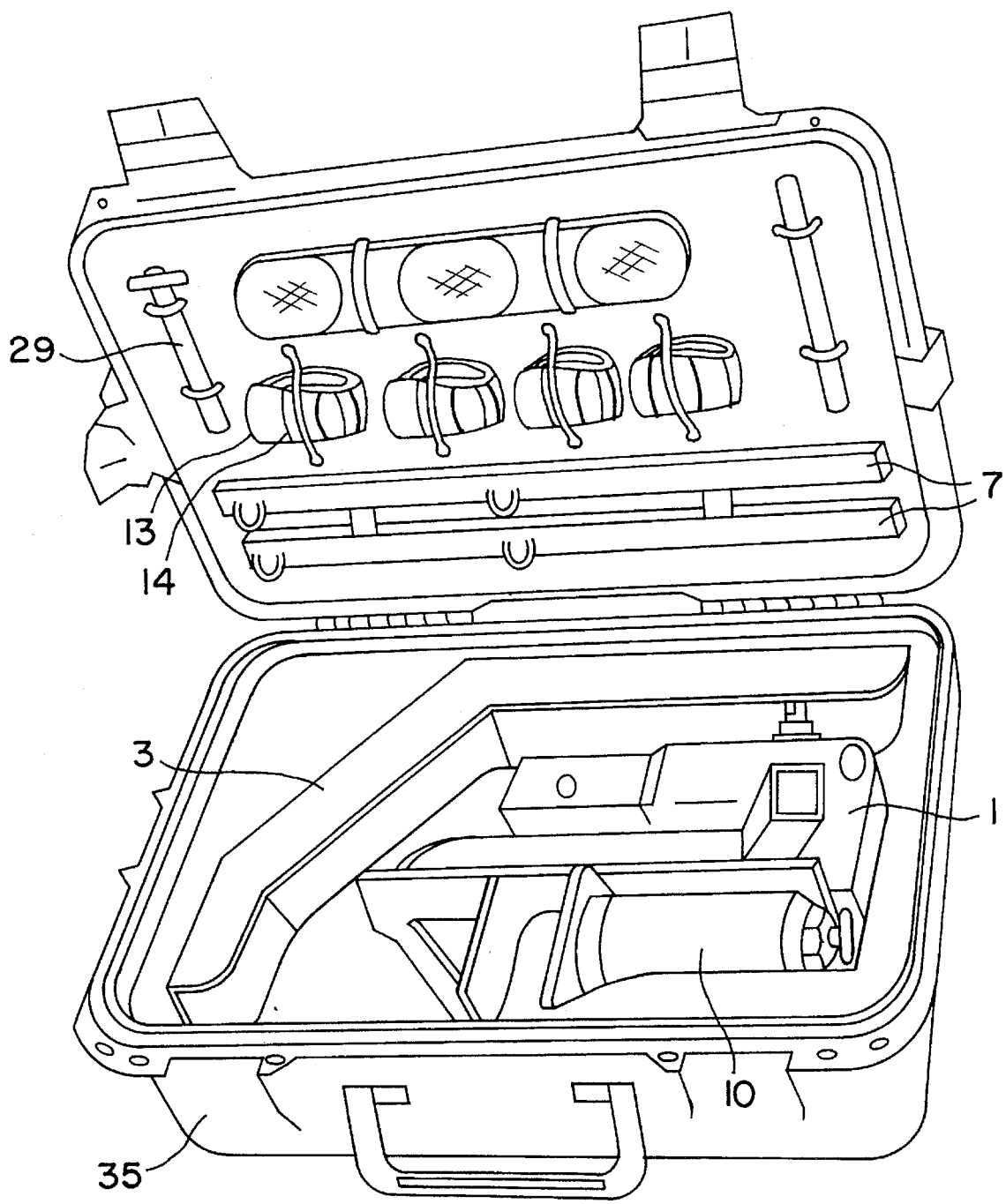
FIG. 6 shows a possible carrying case for the trailering device when it is in knock-down, kit form.

When finished towing, the kickstand on the motorcycle is placed in a down position, the hydraulic jack 10 is placed back in position, if it had been removed, and is pumped until the wheel cradle 3 raises slightly to take the pressure off of nut 18 and washer 17. Nut 18 and washer 17 are loosened and then removed. Pressure from hydraulic jack 10 is then slowly released so that the wheel cradle 3 gently comes to rest with its rear portion 31 on the ground allowing the motorcycle to roll gently back to the loading position shown in FIG. 2. Jack 10 is removed and put away, perhaps in a fitted case (FIG. 6). Then stabilizer straps 13 and 14, on the side of the motorcycle opposite the kickstand, are released so that the motorcycle 22 comes to rest on the kickstand. The other stabilizer (safety) straps (13 & 14) are then released and removed from the towing device and the motorcycle handle bars and placed in the case 35. The stabilizer bars (7, 7') are removed and put in the case. Hitch pin 30 and pivot pin 29 are removed and put away. Wheel cradle 3 is removed and put away. The receiver pin 36 is removed and the support bar 1 is removed from the vehicle and put away.

The complete operation can be performed by one person with medium strength and mechanical ability and the motorcycle need not be in operable condition for this loading and unloading operation to take place.

The foregoing relates to preferred exemplary embodiments of the invention, it being understood that other variants and embodiments thereof are possible within the spirit and scope of the invention, the latter being defined by the appended claims.

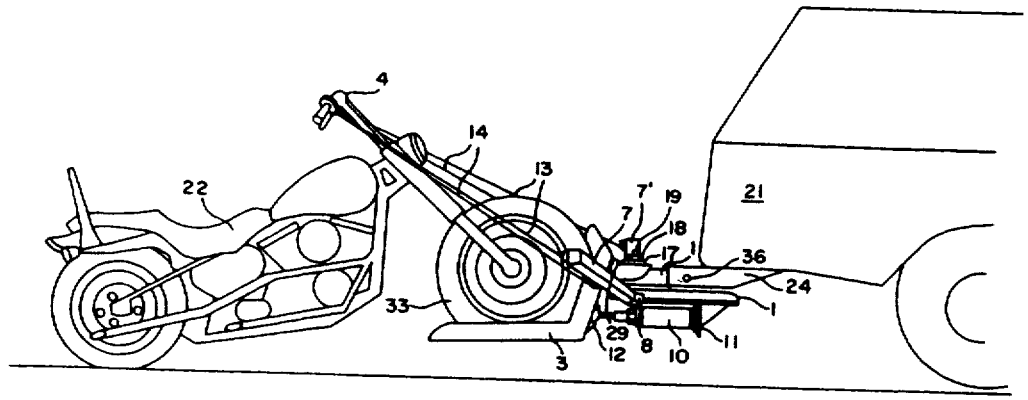

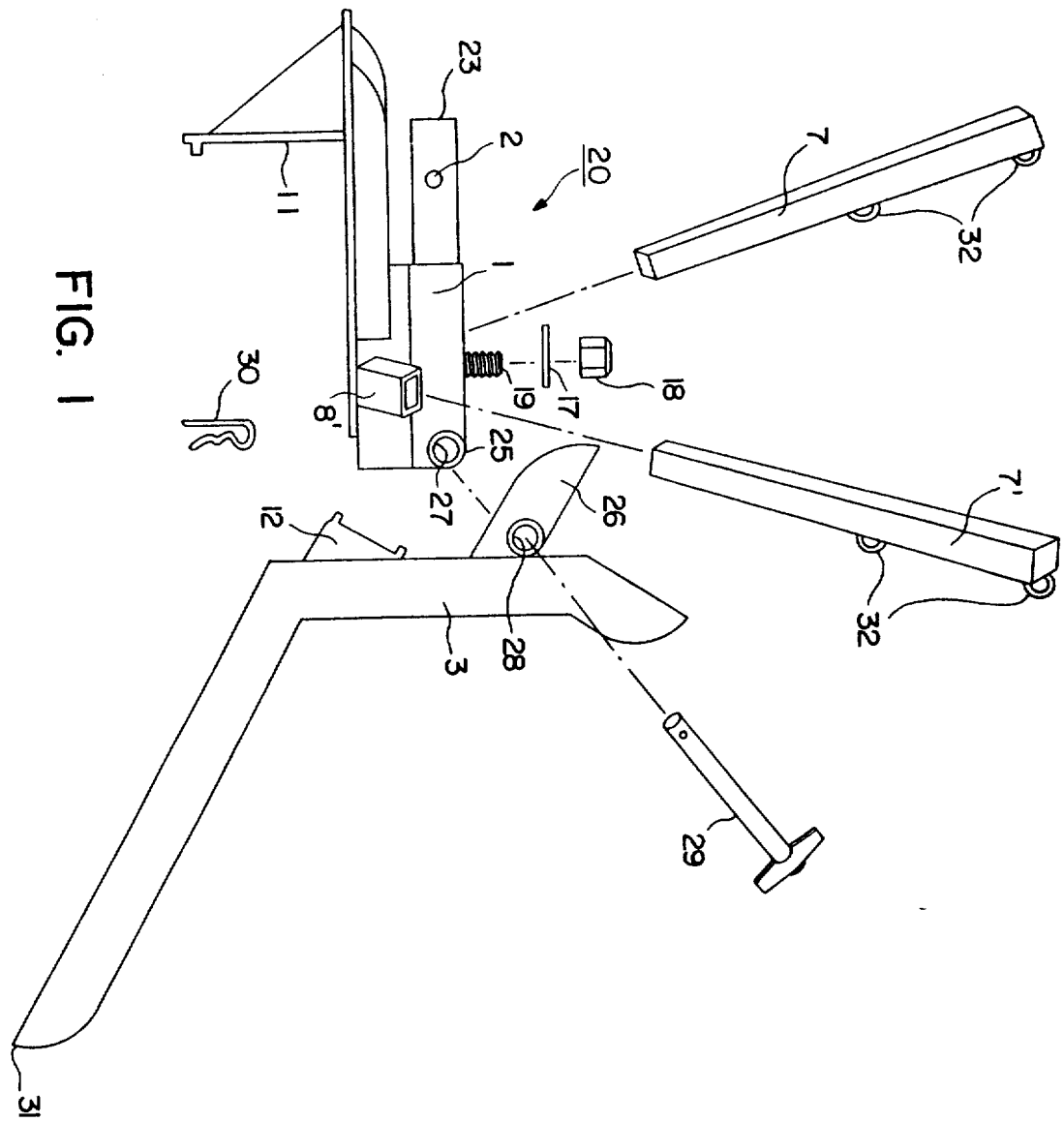

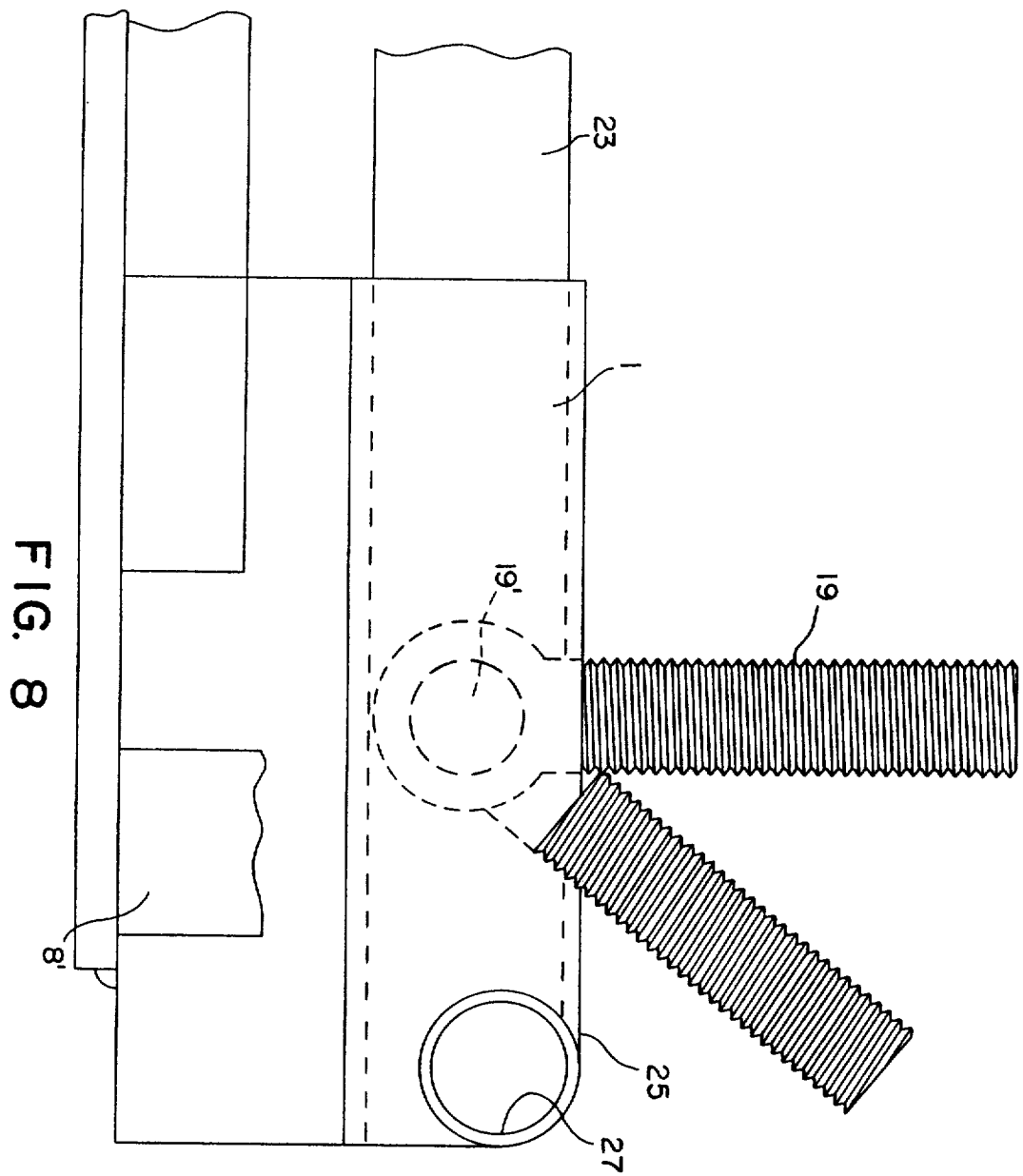

What is claimed:

1. A motorcycle towing device provided in kit form for raising a front wheel of a motorcycle from a ground level to a raised position for towing the motorcycle comprising, a support bar having an extension means receivable into a trailer hitch receiver disposed on a vehicle;

a ramp means having a back side and a front side adapted to cradle a front wheel of a motorcycle on the front side;

means for mounting said ramp means pivotably on a rear extremity of the support bar;

actuator means for applying a force relative to the back side of said ramp means for elevating said ramp means and said motorcycle front wheel set within said front side of said ramp means into a raised position for towing;

means for securing said ramp means in an elevated position for towing said motorcycle; and strap means for stabilizing said motorcycle when towing same.

2. A motorcycle towing device as claimed in claim 1, in which said support bar includes laterally disposed and outwardly projecting socket means on each side thereof adapted to receive complementally shaped stabilizer bars.

3. A motorcycle towing device as claimed in claim 1, in which said ramp means is pivotable between a first position in which said ramp receives said motorcycle front wheel and a second position wherein said front wheel is elevated by said ramp means from ground level to a towing position.

4. A motorcycle towing device as claimed in claim 1, in which said means for pivotably mounting said ramp means comprises arm means positively mounted on and extending from the back side of said ramp means, a first aperture extending through said arm means, a second aperture passing through said support bar and a pivot pin adapted to pass through said first and second apertures when said arm means is oriented with said support bar so that said first and second apertures align with each other.

5. A motorcycle towing device as claimed in claim 1, in which said actuator means for elevating said motorcycle wheel comprises a hydraulic jack means, said hydraulic jack means is mountable beneath said support bar and operable to apply a force against a jacking stud provided on the back side of said ramp means to raise said ramp means into a towing position.

6. A motorcycle towing device as claimed in claim 1, in which said actuator means for elevating the motorcycle front wheel comprises an eye bolt arranged to pass through an elongated aperture in said arm means and a nut means which can be turned down said eye bolt, against said arm means, said nut means thereby applying pressure on said arm means to raise said ramp means upwardly.

7. A motorcycle towing device as claimed in claim 2, in which said bar means comprises a stabilizer bar means provided in each said socket means and at least one stabilizer strap extends from each said stabilizer bar means to a handlebar of said motorcycle.

8. A motorcycle towing device as claimed in claim 6, in which said eye bolt is held pivotably on said support bar.

9. A motorcycle towing device as claimed in claim 1, in which a case is provided having compartment means for storing said support bar, said ramp means, said mounting means, said elevating means, said ramp securing means, and said strap means comprising said motorcycle towing device when said device is in an unassembled form.

10. A motorcycle towing device as claimed in claim 7, in which said at least one stabilizer strap comprises two adjustable straps extending from each said stabilizer bar means to said motorcycle handlebar.

11. A motorcycle towing device as claimed in claim 3, in which said ramp means is a unitary element.

* * * * *

UNITED STATES PATENT AND TRADEMARK OFFICE
CERTIFICATE OF CORRECTION

PATENT NO : 5,620,197
DATED : April 15, 1997
INVENTOR(S) : J Roy Howes

It is certified that error appears in the above-identified patent and that said Letters Patent is hereby corrected as shown below The Title page, showing an illustrative figure, should be deleted and substitute therefor the attached Title page Drawings Delete Drawing Sheets 1-11, and substitute therefor the Drawing Sheets, consisting of Figs 1-11, as shown on the attached pages Signed and Sealed this Third Day of February, 1998

Attest:

BRUCE LEHMAN

Attesting Officer

Commissioner of Patents and Trademarks

United States Patent [19]
Howes

[11] Patent Number: 5,620,197
[45] Date of Patent: Apr. 15, 1997

[54] MOTORCYCLE TOWING DEVICE

[76] Inventor: J. Roy Howes, 665 NW. Archer Ave., Port St. Lucie, Fla. 34983

[21] Appl. No.: 550,432

[22] Filed: Oct. 30, 1995

[51] Int. Cl.$^6$ .................................................. B60R 9/10
[52] U.S. Cl. .............................. 280/402; 414/462
[58] Field of Search .................. 280/402; 414/536, 414/462, 463, 466, 539, 546, 555

[56] References Cited

U.S. PATENT DOCUMENTS

| | | | |
|---|---|---|---|
| 3,740,074 | 6/1973 | Coil | 280/402 |
| 4,113,272 | 9/1978 | Sebby | 280/402 |
| 4,603,874 | 8/1986 | Merrill | 280/402 |
| 5,145,308 | 9/1992 | Vaughn et al. | 280/402 X |
| 5,228,712 | 7/1993 | Speier | 280/402 X |

Primary Examiner—Kevin Hurley
Attorney, Agent, or Firm—Ronald E. Greigg

[57] ABSTRACT

A towing apparatus for a two-wheeled or three-wheeled motorcycle is provided having a support bar which slidably engages a hitch receiver connected to the towing vehicle and having a pivotally connected ramp which, when in a towing position, supports the front wheel. The towing apparatus includes two embodiments, one employing a hydraulic ram to raise the pivotable ramp and the other employing an eye bolt and nut to draw down an arm attached to the pivotable ramp. In either case, support straps are used to create a self-loading, one-person operable device which can be used for running and non-running two-wheeled or three-wheeled motorcycles. This device has the capability of being disassembled and, in such state, this relatively lightweight device is easily stored in its own carrying case.

11 Claims, 11 Drawing Sheets